United States Patent [19]
Bossler, Jr.

[11] 4,321,805
[45] Mar. 30, 1982

[54] ROTARY DRIVE FLEXIBLE COUPLING

[75] Inventor: Robert B. Bossler, Jr., Bloomfield, Conn.

[73] Assignee: Kaman Aerospace Corporation, Bloomfield, Conn.

[21] Appl. No.: 44,481

[22] Filed: Jun. 1, 1979

[51] Int. Cl.³ .............................................. F16D 3/54
[52] U.S. Cl. ......................................... 64/19; 64/31
[58] Field of Search .................... 64/19, 31, 12, 13

[56] References Cited

U.S. PATENT DOCUMENTS

| | | | |
|---|---|---|---|
| 575,314 | 1/1897 | Silvey | 64/19 |
| 587,019 | 7/1897 | Sperry | 64/31 |
| 1,112,219 | 9/1914 | Kennedy | 64/19 |
| 2,721,457 | 10/1955 | Moore | 64/31 |
| 3,481,158 | 12/1969 | Mayerjak | 64/12 |
| 3,592,021 | 7/1971 | Mayerjak | 64/12 |
| 3,625,024 | 12/1971 | Kikuchi | 64/12 |

FOREIGN PATENT DOCUMENTS

5296 of 1907 United Kingdom ................ 64/19

*Primary Examiner*—Charles J. Myhre
*Assistant Examiner*—Magdalen Moy
*Attorney, Agent, or Firm*—McCormick, Paulding & Huber

[57] ABSTRACT

A flexible coupling for drivingly connecting two rotatable shafts or the like includes a flex member connected between driving and driven members. The flex member consists of four flat arms, arranged to form two Vs with their interior angles facing one another, and a connecting piece connected to and extending between the vertices of the two Vs. Angular and endwise misalignment of the axes of the two rotatable parts joined by the coupling is accommodated by bending of the flat arms out of the neutral plane of the flex member and by twisting of the connecting piece. The flex member is easily fabricated as a one-piece unit by cutting it from a flat sheet of metal or plastic or by forming it through a molding or casting process. The coupling may include only a single flex member or it may have a number of such members connected in series to increase its misalignment capabilities.

15 Claims, 17 Drawing Figures

ROTARY DRIVE FLEXIBLE COUPLING

BACKGROUND OF THE INVENTION

This invention relates to flexible couplings for joining two rotatable shafts or other rotatable parts which may have their axes misaligned, and deals more particularly with such a coupling using as the principal connecting element a simple, easily manufactured flex member.

Flexible couplings are commonly used in rotary power transmitting systems for drivingly joining two rotatable parts in cases where it is difficult to precisely align the axes of such parts, where the axes of such parts tend to move or shift relative to one another during operation of the system, or where a misalignment of the axes is intentionally included in the design of the system. One form of misalignment is parallel misalignment wherein the axes of the driving and driven members are parallel to one another in at least one plane but do not intersect. Another form of misalignment is angular misalignment in which the two axes may intersect, but in one plane are at an angle of other than 180 degrees to one another. Still another form of misalignment is endwise misalignment which occurs when one or the other of the driving and driven members moves along its axis to cause the two members to move toward or away from one another.

The general object of this invention is to provide an improved flexible coupling capable of handling relatively large amounts of angular misalignment. More particularly, it is intended to provide a flexible coupling which may be used in many applications where Hooke's or universal joint couplings have conventionally been used in the past to join two drive shafts or the like having their axes positioned at an angle to one another.

A further object of the invention is to provide a flexible coupling of the foregoing character which has a substantially constant angular velocity across the coupling so as to avoid vibratory forces such as generated by conventional Hooke's joint couplings.

Another object of the invention is to provide a flexible coupling which has no relatively sliding parts subject to wear and which coupling, therefore, requires no lubrication and has a long service life.

A still further object of the invention is to provide a flexible coupling which may be readily designed to provide for a shear disconnect, that is it may be made so as to be disconnectible and movable sideways from the driving and driven parts which it joins without disturbing such parts or their supporting bearings. Further, the coupling is one in which there are no hidden surfaces and, therefore, on inspection of the coupling all incipient cracks or other manifestations of potential failure are readily visible.

Prior art U.S. Pat. No. 3,625,024 shows a coupling having a connecting member with some similarity to the flex member of this invention. However, the coupling of said patent is intended primarily to accommodate parallel misalignment and has the arms of its connecting member designed to pivot or bend in the plane of the member. The arms are not designed to bend out of the plane of the connecting member as are the arms of the flex member of this invention.

Other objects and advantages of the invention will be apparent from the drawings and from the following detailed description of the preferred embodiments.

SUMMARY OF THE INVENTION

This invention concerns a flexible coupling having a drive member adapted for connection to a driving shaft or other rotatable driving part and a driven member adapted for connection to a driven shaft or other rotatable driven part. In the neutral condition of the coupling the driving and driven members are rotatable about axes which are generally colinear with one another. The invention especially resides in a flex member of particular structure located between and drivingly connecting the driving member to the driven member. This flex member is or may be a one-piece unit and has four arms and one connecting piece. The arms are arranged to form two Vs having their interior angles facing one another with the connecting piece extending between the verticles of the two Vs. The arms and the connecting piece are fixed to one another at the two vertices and the arms are flat in the plane of the member, or of such other cross-sectional shape, as to be relatively flexible with regard to movement of their free end portions out of the plane of the flex member and as to be relatively rigid with regard to movement of their free end portions in such plane. Two free end portions of the arms are connected to the driving member with these arm end portions being from different ones of the two Vs and located on opposite sides of the axes of rotation, and the other two arm free end portions are fixed to the driven member. Thus, when the axes of the driving and driven members become angularly or endwise misaligned such misalignment is accommodated by bending of the flex member arms and also possibly by twisting of the connecting piece.

The invention also resides in the coupling including a number of flex members connected in series with one another by a connecting means interposed between each adjacent pair of flex members.

DETAILED DESCRIPTION OF THE PREFERRED EMBODIMENTS

Figure 1:
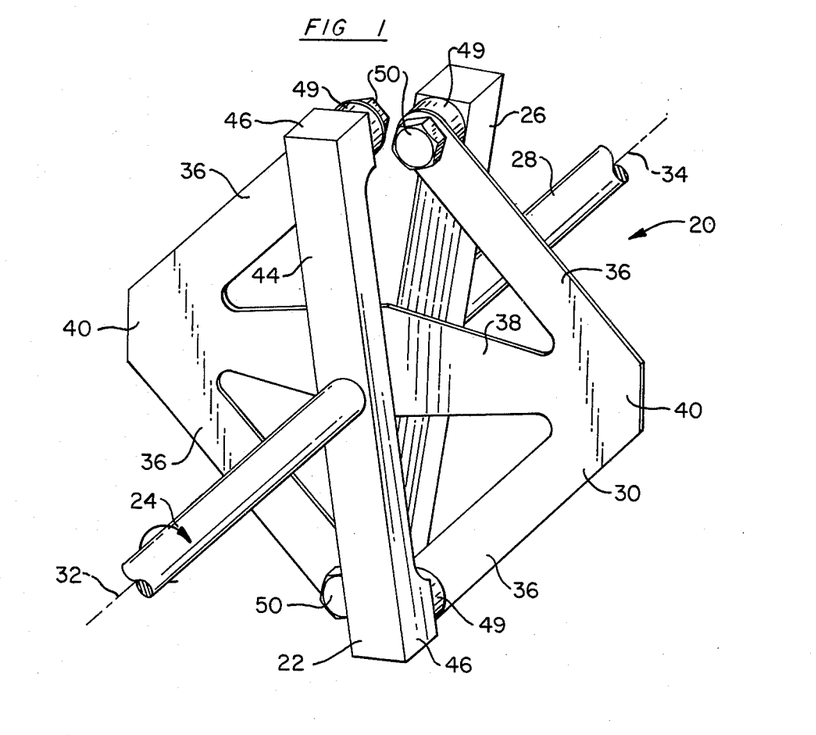
FIG. 1 is a perspective view of a flexible coupling embodying this invention.

FIGS. 1 through 5 show a flexible coupling, indicated generally at 20, embodying the present invention. Referring to these figures, the coupling 20 includes a driving member 22 rotatably fixed to a drive shaft 24 and a driven member 26 rotatably fixed to a driven shaft 28. Connected between the two members 22 and 26 is a flex member 30. In FIG. 1 the coupling is shown in a neutral condition at which the rotational axis 32 of the driving shaft 24 and the rotational axis 34 of the driven shaft 28 are substantially colinear and at which the parts of the flex member 30 are all located substantially in a plane perpendicular to the axes 32 and 34. From the neutral condition of FIG. 1, however, the axes 32 and 34 may be shifted to a substantial degree of angular misalignment and the driving and driven members may be moved endwise toward and away from one another with such changes being accommodated by bending of various portions of the flex member as hereinafter described.

Figure 3:
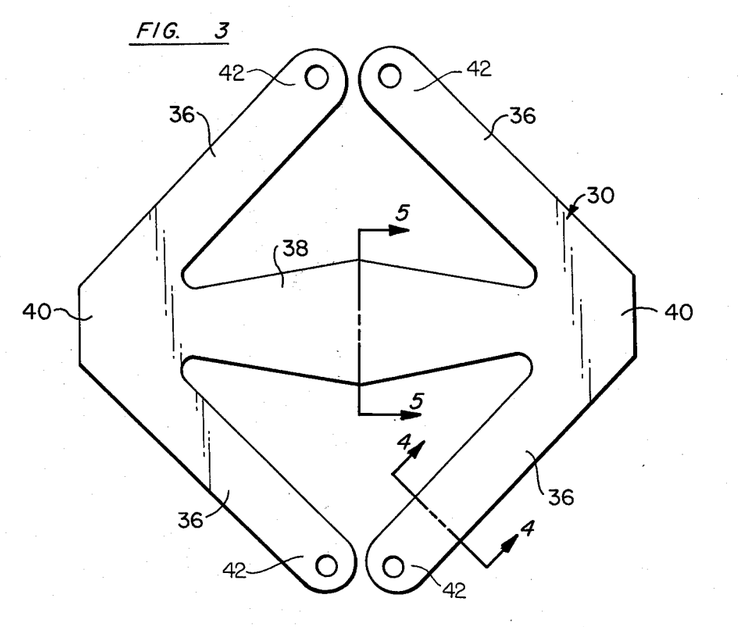
FIG. 3 is a plan view of the flex member used in the coupling of FIG. 1.
Figures 4, 5, 6:
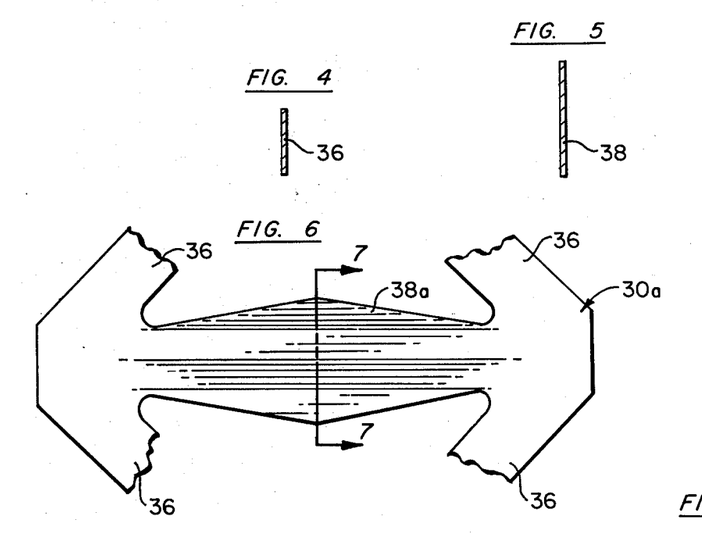
FIG. 4 is a cross-sectional view taken on the line 4—4 of FIG. 3.
FIG. 5 is a cross-sectional view taken on the line 5—5 of FIG. 3.
FIG. 6 is a fragmentary plan view of an alternative form of the flex member usable in the coupling of FIG. 1.

The flex member 30 consists of four arms 36, 36 and a connecting piece 38 all made of an elastically bendable material such as metal or plastic. The four arms are arranged to form two Vs having their interior angles facing one another with the connecting piece 38 extending between their two vertices 40, 40. The two arms 36, 36 of each V and the adjacent end of the connecting piece 38 are fixedly joined to one another at the associated vertex 40. Preferably, the four arms 36, 36 are of equal length and the two arms of each V are arranged at a right angle to each other so as to provide the flex member 30 with a generally square shape as seen in FIG. 3. The arms 36, 36 are flat, with their major surfaces facing generally axially of the coupling, and have relatively thin rectangular cross-sections as shown in FIG. 4. Therefore, each arm 36 is relatively flexible with regard to bending of its free end portion 42 out of the plane of the flex member and is relatively rigid with regard to bending of the free end portion in the plane of the flex member. The connecting piece 38 of the member 30 also has a thin rectangular cross-section as shown in FIG. 5 and is, therefore, capable of twisting under the influence of a torque applied at its opposite ends.

The four arms 36, 36 and the connecting piece 38 of the flex member 30 may be initially separate parts fixed to one another by welding, riveting or other means, but preferably the flex member is of a one-piece construction which may be achieved by cutting the member from a flat piece of sheet metal or plastic, or such one-piece construction may also be obtained by forming the member from metal or plastic through a molding or casting process.

Figure 2:
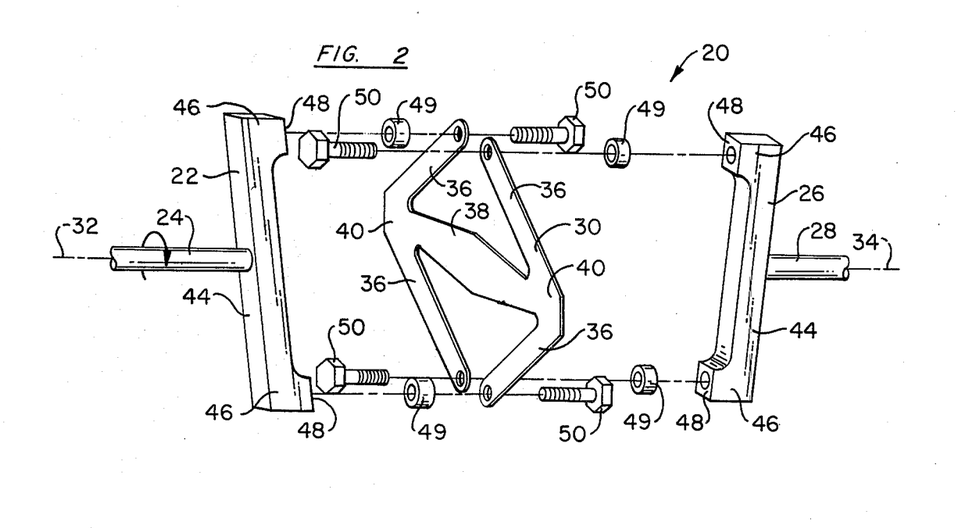
FIG. 2 is an exploded perspective view of the coupling of FIG. 1.

Referring to FIGS. 1 and 2, the driving and driven members 22 and 26 may take various different forms, but as shown they are similar to one another with each including a body portion 44 and two protrusions 46, 46. The two protrusions 46, 46 of each member are located on opposite sides of the associated axis 32 or 34, and at equal distances from such axis, and extend axially toward the flex member 30. At the end of each protrusion is an axially facing bearing surface 48.

The flex member 30 has the free end portion of two of its arms connected to the driving member 22 and the free end portions of its other two arms connected to the driven member 26. The two arms connected to the driving member are from different ones of the two Vs and are located on opposite sides of the connecting piece 38, as evident from FIGS. 1 and 2. Likewise, the two arms connected to the driven member are from different ones of the two Vs and are located on opposite sides of the connecting piece 38. The free end portion of each arm is apertured to receive the shank of a headed threaded fastener 50. In the assembled coupling, as shown in FIG. 1, each fastener 50 passes through the associated aperture of the flex member and is threadably received by the associated protrusion 46 whereby the associated free arm end portion of the flex member is held in tight and fixed engagement with the bearing surface 48 of the protrusion by being clamped between such bearing surface and the head of the fastener. If desired, a spacer 49 as shown may also be used between each arm end portion and its associated abutment surface 48.

In FIG. 1 the arrow indicates one possible direction of rotation for the driving shaft 24. In this direction of rotation, the arms 36, 36 of the flex member are in tension and the connecting piece 38 is in compression. The driving shaft 24 may, however, also be rotated in the reverse direction in which case the arms of the flex member are in compression and the connecting piece 38 is in tension. The roles of the driving and driven members may also be reversed or exchanged without any change in the construction of the coupling.

Figure 7:
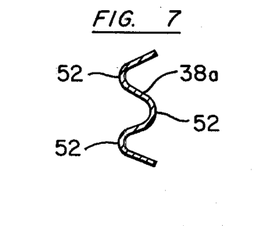
FIG. 7 is a cross-sectional view taken on the line 7—7 of FIG. 6.

In some cases it may be desirable to provide the connecting piece 38 with a cross-sectional shape other than the rectangular one shown in FIG. 5 in order to increase its resistance to compression or column loading. One such alternative form of cross-section for the connecting piece is shown in FIGS. 6 and 7 which show a flex member 30a having a connecting piece 38a having a number of ribs 52, 52 extending along the length of the piece. If the flex member 30a is cut as a blank from a piece of sheet metal such ribs 52, 52 may be pressed into the connecting piece after the blank is cut from the sheet material. Except for the ribs 52, 52 the flex member 30a is identical to the flex member 30 of FIGS. 1 to 5 and may be substituted for that flex member in any of the couplings described herein.

A feature of the coupling 20 is that the line connecting the two points at which the flex member 30 is connected to the driving member 22 and the line connecting the two points at which the flex member is connected to the driven member 26 have a very small angle with one another and are close to being parallel. With this being the case, as the driving shaft 24 is rotated the driven member 26 is constrained at all angles of rotation to move at substantially the same speed as the driving member 22 and, therefore, the coupling has a substantially constant velocity characteristic whereby little or no vibratory forces are created as the coupling is operated.

Figure 8:
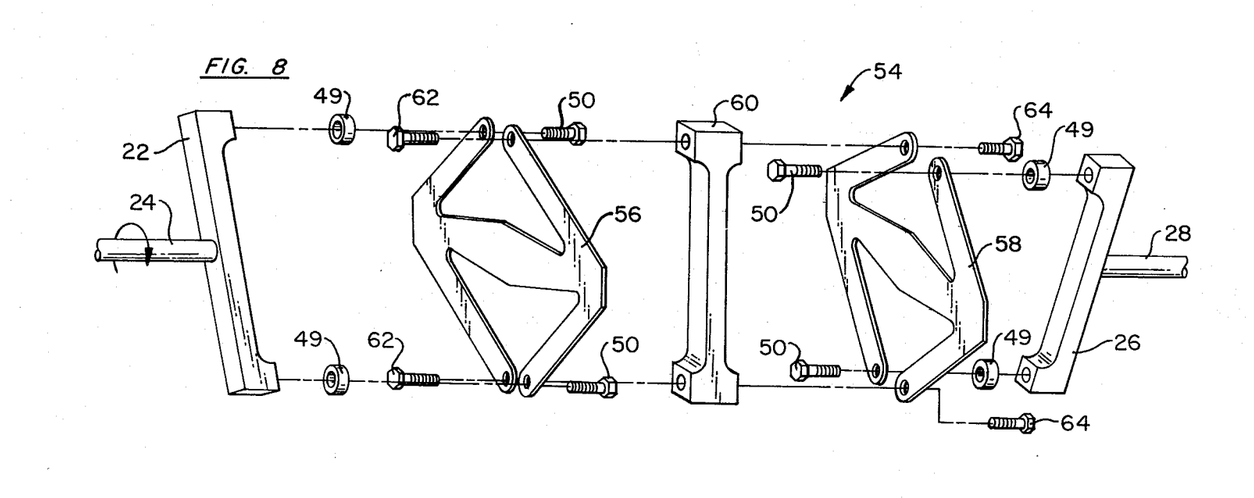
FIG. 8 is an exploded perspective view of a flexible coupling comprising another embodiment of this invention.

In addition to using only a single flex member as in the coupling 20 of FIGS. 1 to 5, a coupling in accordance with this invention may alternatively include two or more flex members connected in series to increase its misalignment capability. One such coupling is shown in FIG. 8 and includes two flex members 56 and 58, each similar to the flex member 30 of the coupling 20. Other parts of the coupling which are similar to that of the coupling 20 have been given the same reference numerals as in FIGS. 1 to 5 and need not be further described. In addition to the extra flex member, the coupling 54 also includes a connecting means between the two flex members in the form of a rigid connecting member 60. The two free arm end portions of the flex member 56 which are not connected to the driving member 22 are fixed to the connecting member 60 by threaded fasteners 62, 62. Likewise, the two free arm end portions of the flex member 58 which are not connected to the driven member 26 are fixed to the connecting members 60 by two threaded fasteners 64, 64. The connecting member 60 is I-shaped so that the points at which the flex member 56 are connected to it are aligned with the points at which the flex member 58 is connected to it. Also, the flex members are arranged so that when the driving member is rotated in the direction indicated by the arrow the arms of the flex member 56 are in tension and also the arms of the flex member 58 are in tension. This, however, is not essential to the broader aspects of the invention and if desired the flex members may be arranged so that for either direction of rotation the arms of one flex member are in tension and the arms of the other flex member are in compression. In FIG. 8 this could be accomplished, for example, by taking those arms of the flex member 58 which are shown attached to the driven member 26 and attaching them instead to the connecting member 60 and by taking those arms of the flex member 58 which are shown attached to the connecting member 60 and attaching them instead to the driven member 26, and by making no other changes.

In the coupling 54 of FIG. 8, the driven member 26 is angularly displaced from the driving member 22 by an angle equal to twice the angular displacement provided by the coupling 20 using only a single flex member. If desired, different angular displacements of the driven member 26 relative to the driving member 22 may be obtained in a coupling with two flex members by using a different connecting means between the two flex members. For example, FIGS. 9 to 12 show a coupling 66 which is similar to the coupling 54 of FIG. 8 except that the connecting member 60 of FIG. 8 is replaced by a rectangular rigid connecting member 68. By use of a rectangular connecting member, such as the member 68, the two points at which the flex member 56 are connected to it and the two points at which the flex member 58 are connected to it are not aligned. Therefore, by properly shaping the connecting member and locating the points of flex member attachment, the flex member 58 may be set at any desired angle relative to the flex member 56 to achieve a desired angular relationship between the flex members or between the driving member 22 and the driven member 26. In the coupling 66, as seen best in FIGS. 11 and 12, the shape and construction of the connecting member 68 is such that the two flex members 56 and 58 are arranged in the coupling with their connecting pieces 38, 38 at right angles to each other. This also causes the line 70 containing the two points at which the flex member 58 is connected to the driven member 26 and the line 72 containing the two points at which the flex member 56 is connected to the driving member 22 to be located at approximately right angles to one another. This construction has the advantage that the bending stiffness of the coupling with regard to angular misalignment is approximately constant in all angular directions.

Figure 9:
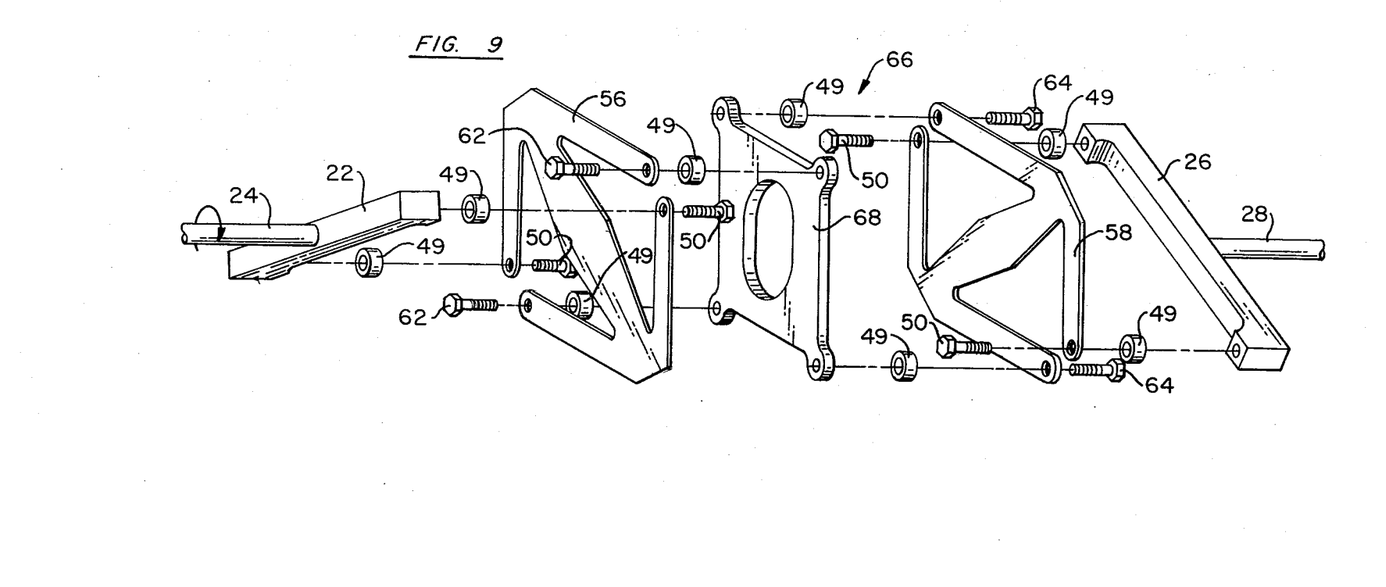
FIG. 9 is an exploded perspective view of a flexible coupling comprising still another embodiment of this invention.
Figure 10:
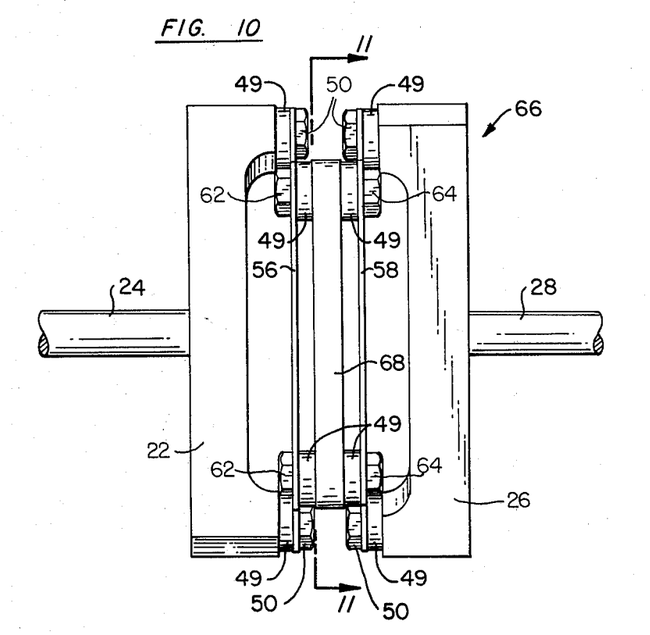
FIG. 10 is a side elevational view of the coupling of FIG. 9.
Figure 11:
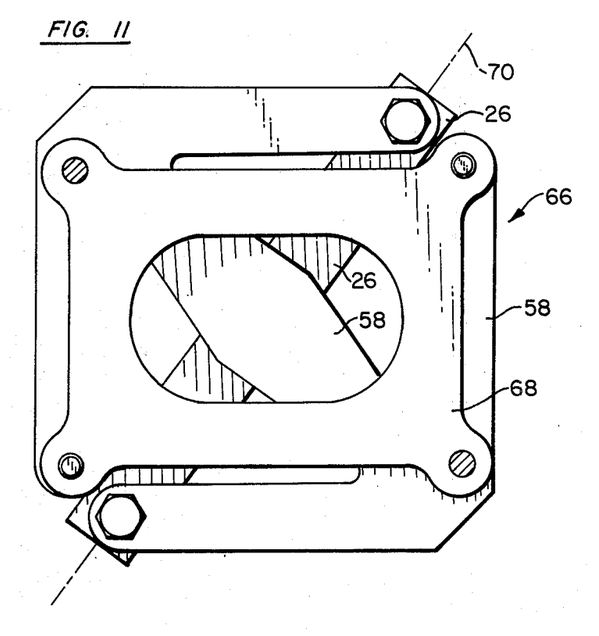
FIG. 11 is a cross-sectional view taken on the line 11—11 of FIG. 10.
Figure 12:
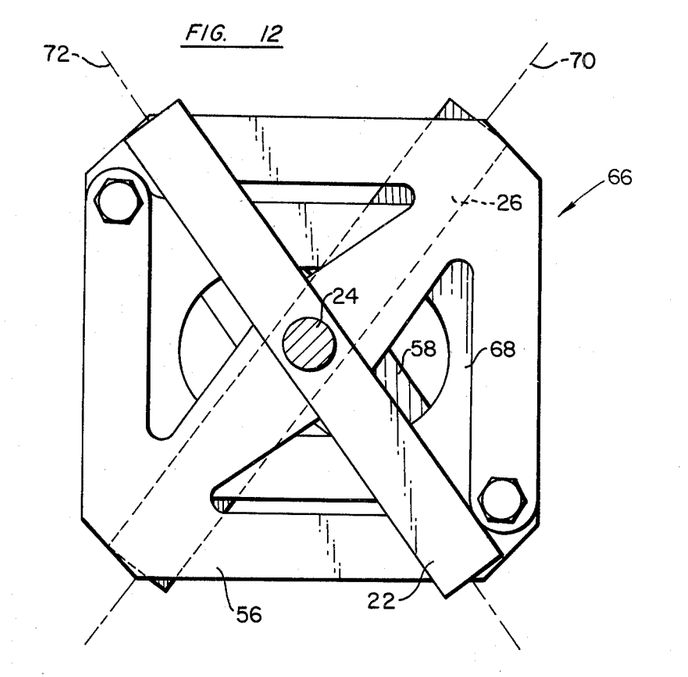
FIG. 12 is a cross-sectional view taken on the line 12—12 of FIG. 10.
Figure 13:
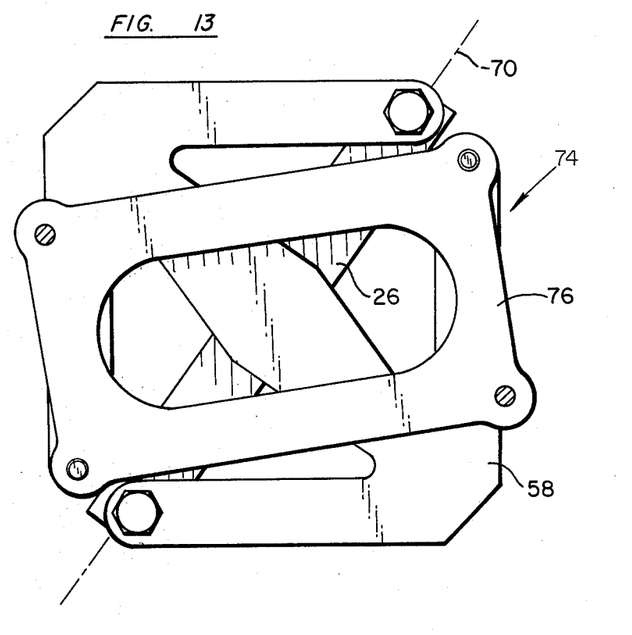
FIG. 13 is a view similar to FIG. 11 but showing a coupling comprising another embodiment of this invention.
Figure 14:
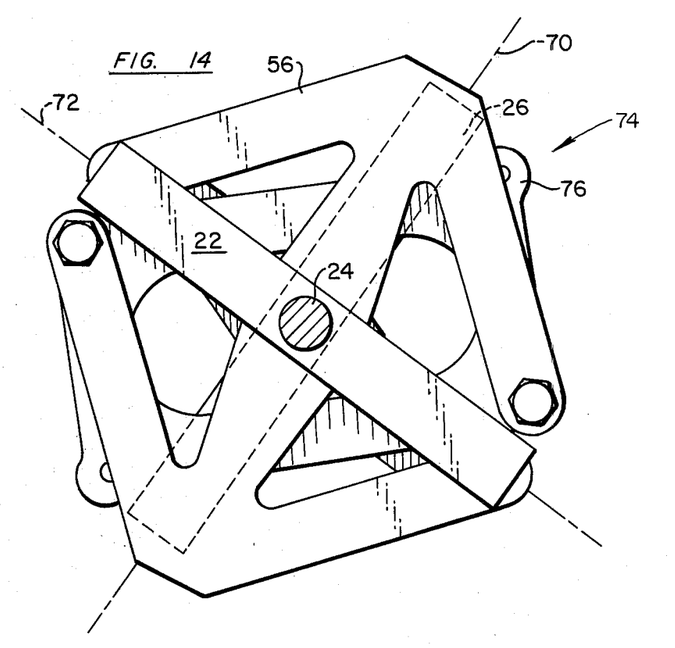
FIG. 14 is a view similar to FIG. 12 but showing the coupling of FIG. 13.

FIGS. 13 and 14 show a coupling 74 which is similar to the coupling 66 of FIGS. 9 to 11 except for including a rigid connecting member 76 instead of the member 68. The connecting member 76 is of such a shape as to cause the lines 70 and 72 to be exactly at right angles to one another. This construction also has the advantage of causing the coupling to have a substantially constant bending stiffness at all angles.

Figure 15:
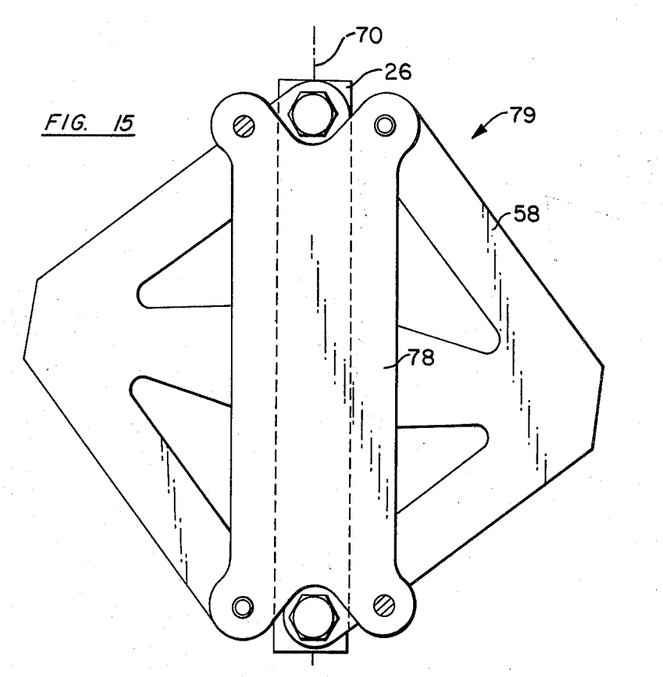
FIG. 15 is a view similar to FIG. 11 but showing a coupling comprising still another embodiment of this invention.
Figure 16:
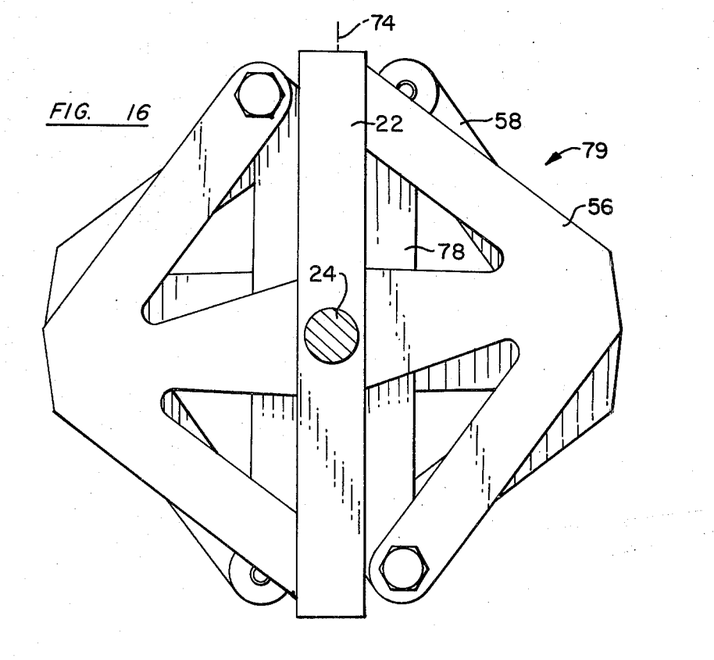
FIG. 16 is a view similar to FIG. 12 but showing the coupling of FIG. 15.

FIGS. 15 and 16 show a coupling 79 which is similar to the coupling 66 of FIGS. 9 to 12 except for using a rigid rectangular connecting member 78 in place of the connecting member 68. The connecting member 78 is so shaped that the line 70 is parallel with the line 72, that is the driving member 22 is angularly aligned with the driven member 26, thereby providing the coupling with a constant velocity characteristic.

Figure 17:
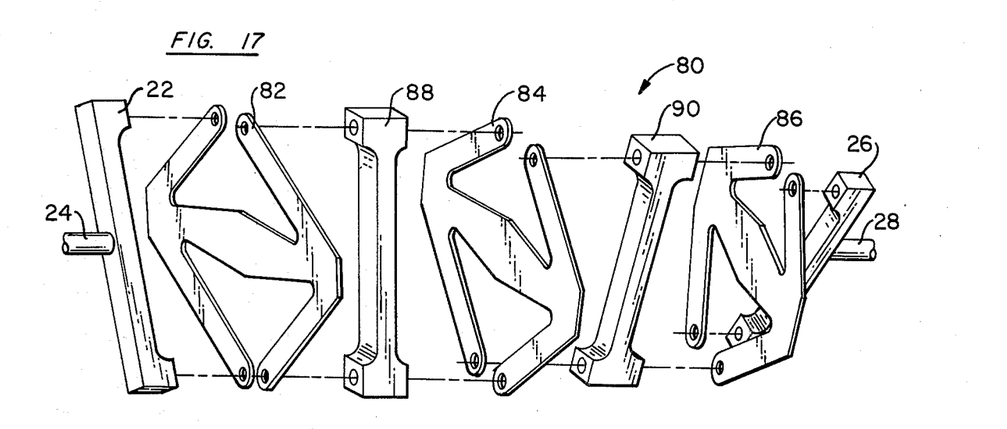
FIG. 17 is an exploded perspective view of a coupling comprising still another embodiment of this invention.

As previously mentioned, a coupling in accordance with the invention may use any number of flex members connected in series, and FIG. 17, by way of example, shows a coupling 80 having three flex members 82, 84 and 86, each similar to the flex member 30 of the coupling 20, and two connecting members 88 and 90 each similar to the connecting member 60 of the coupling 54. Threaded fasteners similar to those previously described, and which are omitted for clarity in FIG. 17, are used to connect the free end portions of the flex members to the driving member, the driven member and to the connecting members 88 and 90 in the same manner as previously described. The connecting members 88 and 90 in FIG. 17 are exemplary only and other connecting members of various different shapes may be employed if desired. The connecting member or members can be so shaped that any angular relationship will be provided between driving member 22 and driven member 26.

I claim:

1. A flexible coupling comprising a driving member rotatable about a first axis, a driven member rotatable about a second axis generally colinear with said first axis, and a flex member located substantially in a plane generally perpendicular to said first and second axes, said flex member consisting of four arms and one connecting piece, two of said arms being arranged to form a first V and having their adjacent ends rigidly fixed to one another at the vertex of said first V, the other two of said arms being arranged to form a second V and having their adjacent ends rigidly fixed to one another at the vertex of said second V, said two Vs being arranged so that their interior angles generally face one another, and said connecting piece extending between said two vertices of said two Vs and being rigidly fixed at each of its ends to the adjacent one of said two vertices whereby the free end portions of said arms are movable relative to one another only by bending of said flex member, means fixing said driving member to the free end portion of one of said arms of said first V and to the free end portion of one of said arms of said second V, said two free arm end portions to which said driving member is fixed being located on opposite sides of said connecting piece, and means fixing said driven member to the free end portions of the remaining two of said arms, said four arms being made of such material and being of such cross-sectional shape so as to be relatively flexible with regard to movement of their free end portions out of said plane and as to be relatively rigid with regard to movement of their free end portions in said plane.

2. A flexible coupling as defined in claim 1 further characterized by the two points on said driving member at which it is connected to its associated two free arm end portions being located generally diametrically opposite from one another relative to said first axis and the two points on said driven member at which it is connected to its associated two free arm end portions being located generally diametrically opposite from one another relative to said second axis.

3. A flexible coupling as defined in claim 1 further characterized by said flex member being of one-piece construction and being made of generally flat sheet material.

4. A flexible coupling as defined in claim 1 further characterized by each of said arms of said flex member having along a major portion of its length a width measured parallel to said plane which is at least three times greater than its thickness measured perpendicular to said plane.

5. A flexible coupling as defined in claim 1 further characterized by said driving member having two flat bearing surfaces located on opposite sides of said first axis and facing said flex member, each of said two free arm end portions which are fixed to said driving member having a flat bearing surface flatly engaging a respective one of said two bearing surfaces of said driving member, said means for fixing said two free arm end portions to said driving member comprising means for holding said bearing surfaces of each of said end portions in tight engagement with its associated one of said bearing surfaces of said driving member, said driven member having two flat bearing surfaces located on opposite sides of said second axis and facing said flex member, each of said two free arm end portions fixed to said driven member having a flat bearing surface flatly engaging a respective one of said two bearing surfaces of said driven member, and said means for fixing said two free arm end portions to said driven member comprising means for holding said bearing surface of each of said latter end portions in tight engagement with its associated one of said bearing surfaces of said driven member.

6. A flexible coupling as defined in claim 5 further characterized by said driving member having a body portion and two protrusions extending axially from said body portion toward said flex member, said two flat bearing surfaces of said driving member being located respectively on the ends of said two driving member protrusions, and said driven member having a body portion and two protrusions extending axially from said body portion of said driven member toward said flex member, said two bearing surfaces of said driven member being located on the ends of said two driven member protrusions.

7. A flexible coupling as defined in claim 6 further characterized by said means for fixing said two free arm end portions to said driving member comprising for each of said end portions a headed fastener passing through the end portion and threadably received by the associated protrusion of said driving member with the head of said fastener serving to hold the end portion between it and the associated bearing surface of said driving member to restrain it against axial movement relative to said driving member, and said means for fixing said two free arm end portions to said driven member comprising for each of said end portions a headed fastener passing through said end portion and threadably engaged with the associated protrusion of said driven member with the head of said fastener serving to hold the end portion between it and the associated bearing surface of said driven member to restrain it against axial movement relative to said driven member.

8. A flexible coupling comprising a driving member and a driven member respectively rotatable about axes of rotation which at least nearly intersect at the location of said coupling, and a flex member located between said driving and driven members, said flex member consisting of four flat arms and one connecting piece, said four flat arms having their major surfaces facing generally axially relative to said axes of rotation, two of said arms being arranged to form a first V located on one side of said axes and having their adjacent ends rigidly fixed to one another at the vertex of said first V, the other two of said arms being arranged to form a second V on the opposite side of said axes from said first V and having their adjacent ends rigidly fixed to one another at the vertex of said second V, said two Vs being arranged so that their interior angles face one another, and said connecting piece extending between said two vertices of said two Vs and being rigidly fixed at each of its ends to the adjacent one of said two vertices whereby the free end portions of said arms are movable relative to one another only by bending of said flex member, means fixing said driving member to the free end portion of one of said arms of said first V and to the free end portion of one of said arms of said second V, said two free arm end portions to which said driving member is fixed being located on opposite sides of said axes, and means fixing said driven member to the free end portions of the remaining two of said arms.

9. A flexible coupling as defined in claim 8 further characterized by said flex member being made entirely of a single piece of sheet material.

10. A flexible coupling comprising a driving member and a driven member respectively rotatable about axes of rotation which at least nearly intersect at the location of said coupling, two flex members located between said driving and driven members, each of said flex members consisting of four flat arms and one connecting piece, said four flat arms of each flex member having their major surfaces facing generally axially relative to said axes of rotation, two of said arms of each flex member being arranged to form a first V located on one side of said axes and having their adjacent ends rigidly fixed to one another at the vertex of said first V, the other two of said arms of each flex member being arranged to form a second V on the opposite side of said axes from said first V and having their adjacent ends rigidly fixed to one another at the vertex of said second V, said two Vs of each flex member being arranged so that their interior angles face one another, and said connecting piece of each flex member extending between said two vertices of said two Vs of said flex member and being rigidly fixed at each of its ends to the adjacent one of said two vertices whereby the free end portions of said arms of each flex member are movable relative to one another only by bending of said flex member, means fixing said driving member to the free end portion of one of said arms of one of said Vs of one of said flex members and to the free end portion of one of said arms of the other of said Vs of said one flex member, said two free arm end portions of said one flex member to which said driving member is fixed being located on opposite sides of said axes, means fixing said driven member to the free end portion of one of said arms of one of said Vs of the other of said flex members and to the free end portion of one of said arms of the other V of said other flex member, said two free arm end portions of said other flex member to which said driven member is fixed being located on opposite sides of said axes, a connecting means between said two flex members, means fixing the free end portions of the remaining two of said arms of said one flex member to said connecting means, and means fixing the free end portions of the remaining two of said arms of said other flex member to said connecting means.

11. A flexible coupling as defined in claim 10 further characterized by the two points at which said remaining two arms of said one flex member are fixed to said connecting means and the two points at which the free end portions of the remaining two arms of said other flex member are fixed to said connecting means being so arranged that the connecting pieces of said two flex members are arranged substantially at a right angle to one another.

12. A flexible coupling as defined in claim 10 further characterized by the two points at which said remaining two arms of said one flex member are fixed to said connecting means and the two points at which the free end portions of the remaining two arms of said other flex member are fixed to said connecting means being so arranged that the line containing the two points at which said one flex member is fixed to said driving member and the line containing the two points at which said other flex member is fixed to said driven member are substantially at a right angle to one another.

13. A flexible coupling as defined in claim 10 further characterized by the two points at which said remaining two arms of said one flex member are fixed to said connecting means and the two points at which the free end portions of the remaining two arms of said other flex member are fixed to said connecting means being so arranged that the line containing the two points at which said one flex member is fixed to said driving member and the line containing the two points at which said other flex member is fixed to said driven member are substantially parallel to one another.

14. A flexible coupling as defined in claim 10 further characterized by said two flex members being the only flex members in said coupling and said connecting means being a one-piece connecting member.

15. A flexible coupling comprising a driving member and a driven member respectively rotatable about axes of rotation which at least nearly intersect at the location of said coupling, a plurality of flex members located between said driving and driven members and spaced from one another along a line extending between said driving and driven members, each of said flex members consisting of four flat arms and one connecting piece, said four flat arms of each flex member having their major surfaces facing generally axially relative to said line, two of said arms of each flex member being arranged to form a first V located on one side of said line and having their adjacent ends rigidly fixed to one another at the vertex of said first V, the other two of said arms of each flex member being arranged to form a second V on the opposite side of said line from said first V and having their adjacent ends rigidly fixed to one another at the vertex of said second V, said two Vs of each flex member being arranged so that their interior angles face one another, and said connecting piece of each flex member extending between said two vertices of said two Vs of said flex member and being rigidly fixed at each of its ends to the adjacent one of said two vertices whereby the free end portions of said arms of each flex member are movable relative to one another only by bending of said flex member, said plurality of flex members including two end flex members located at opposite ends of said plurality of flex members, means fixing said driving member to the free end portion of one of said arms of one of said Vs of one of said end flex members and to the free end portion of one of said arms of the other of said Vs of said one end flex member, said two free arm end portions of said one end flex member to which said driving member is fixed being located on opposite sides of said line, means fixing said driven member to the free end portion of one of said arms of one of said Vs of the other of said end flex members and to the free end portion of one of said arms of the other V of said other end flex member, said two free arm end portions of said other end flex member to which said driven member is connected being located on opposite sides of said line, a connecting member located between each adjacent pair of said plurality of flex members, and means fixing to each said connecting member two free end portions of the arms of the flex member located on one side of said connecting member and two free end portions of the arms of the flex member located on the other side of said connecting means, the two free arm end portions of each flex member which are fixed to said connecting member being from different ones of the two Vs of said flex member and being located on opposite sides of said line.

* * * * *